Figures 1, 2:
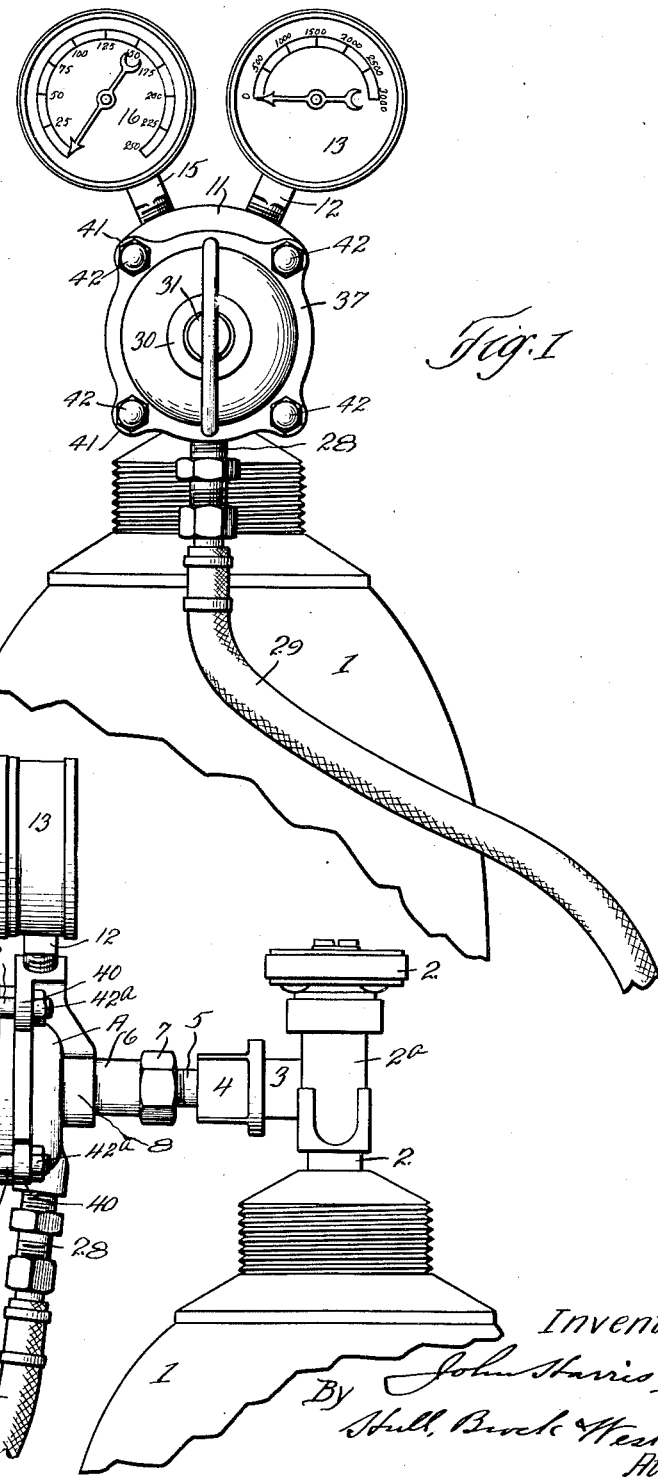

Feb. 14, 1928.

J. HARRIS

REGULATOR

Filed May 4, 1925

1,659,263

2 Sheets-Sheet 1

Inventor
John Harris.
By Hull, Buck & West.
Attys.

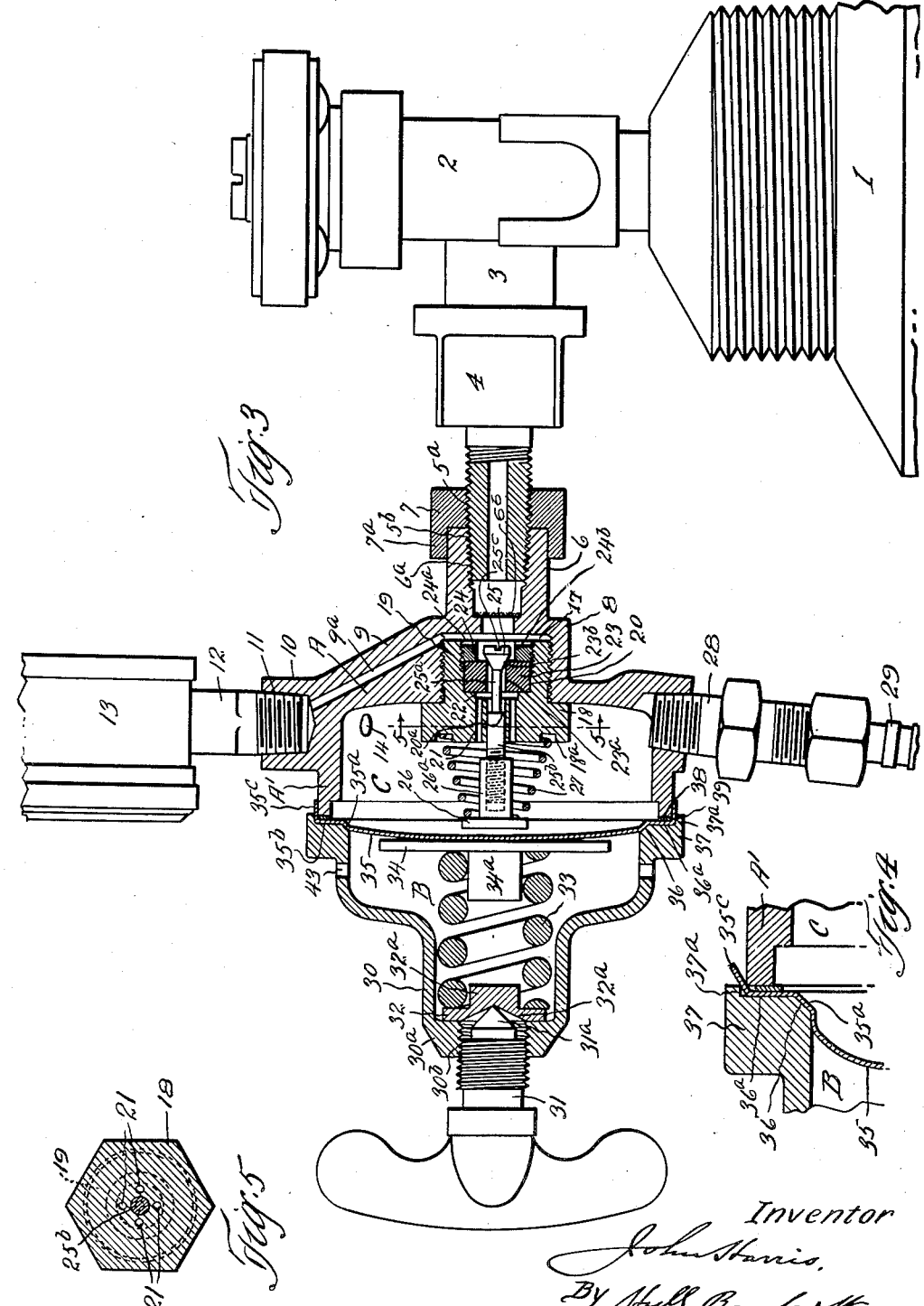

Patented Feb. 14, 1928.

1,659,263

UNITED STATES PATENT OFFICE.

JOHN HARRIS, OF CLEVELAND, OHIO, ASSIGNOR TO THE HARRIS CALORIFIC COMPANY, OF CLEVELAND, OHIO, A CORPORATION OF OHIO.

REGULATOR.

Application filed May 4, 1925. Serial No. 27,760.

This invention relates to regulators for gases, and more particularly to regulators of the type employed for the oxygen and combustible gases used with cutting and welding torches. One of the objects of my invention is to provide a regulator of this character which will be safe and reliable in operation and one wherein, in the event of the development of an undue pressure of gas within the regulator body, such gas will escape around the peripheral portion of the diaphragm, without rupturing the latter, thereby avoiding injury to the body of the regulator and to the workmen or others in the vicinity. Another object of the invention is to provide a construction of regulator which will render it practically impossible for any part of the casing in which the gas or gases under pressure are normally contained to be blown away through the development of an abnormally high pressure of gas within the body of the regulator.

A further object of the invention is to improve and simplify the manner of supporting and assembling the diaphragm, whereby the diaphragm will not only be capable of the operation referred to hereinbefore, but may be readily and conveniently applied to and secured in place and may be readily removed, should occasion require.

Another object of the invention is to provide an improved construction of valve for supplying the high-pressure gas to the regulator body; also an improved manner of operating such valve, whereby the valve may be opened through the diaphragm but without distortion of the latter or injury thereto.

A still further object of the invention is to provide an improved connection between the tank and the regulator body.

Further and more limited objects of the invention will appear in the detailed part of the specification which follows, the invention being shown in its present preferred form in the drawings forming part hereof, wherein Fig. 1 represents a front elevation of a portion of a gas tank having my regulator applied thereto; Fig. 2 a side elevation of the regulator and the upper portion of such tank; Fig. 3 a central sectional view through the body of the regulator, the parts to which the regulator are connected being shown in elevation; Fig. 4 a detail in section of the diaphragm and the clamping means, showing the action of the diaphragm when subjected to undue pressure; and Fig. 5 a detail in section corresponding to the line 5—5 of Fig. 3.

Describing the various parts by reference characters, 1 denotes the supply tank, which may contain any gas the pressure of which is to be regulated. This tank is provided at its upper end with the usual valve having a casing 2, said valve serving to control or cut off the flow of gas from the tank to the outlet connection 3. Secured to the connection 3, as by a gland nut 4, is the adjacent end of a delivery connection 5. The delivery portion of the connection 5 is threaded, as indicated at $5^a$, and the end of such threaded portion is tapered, as shown at $5^b$, whereby it is threaded into a correspondingly tapered seat $6^a$ within the outer portion of the bore of the regulator connection 6. 7 denotes a lock nut which is threaded upon the portion $5^a$ of the connection 5 and which is provided with a sleeve $7^a$ which is adapted to fit closely about the outer surface of the adjacent end of the connection 6. The tapered connection between the part $5^b$ and the part $6^a$ enables a tight connection to be made between these parts, and the nut 7 not only locks the parts against unintentional loosening or separation, but also resists any tendency of the parts so connected to rock or twist. Furthermore, the sleeve $7^a$ prevents the expansion of the outer end of the connection 6 by the pressure of the gas therein, thereby preventing escape of the gas as well as preventing injury to the connections 5 and 6.

The connection 6 is shown as formed with the combined end cap section A and body section A' of the regulator. The connection merges with a boss 8 on the cap section A from which a rib 9 extends to a segmental boss 10 formed on the side of the regulator body and provided with a bore 11 for the nipple 12 of the high pressure gage 13. The boss 10 is also provided with another bore which communicates with the chamber C in the body A', said chamber being formed between the cap A and the diaphragm and the chamber end of said bore being indicated at 14. From this bore a connection 15 extends to the low-pressure gage 16. A passageway $9^a$ in the rib 9 establishes communication between the gage 13 and the outer or receiving end of a chamber 17 formed within the boss 8, which chamber receives the gas from the tank through the connections 5 and 6, the chamber communicating at its outer end with the inner end of the bore of the connection 6, such end being provided with with a strainer 6$^b$ for preventing any sediment in the gas from entering the chamber 17.

Threaded into the chamber 17 is a valve body, the same having at its inner end a hexagonal head 18 and a cylindrical body 19, which is threaded into said chamber. This body is provided with a cylindrical chamber 20 in its outer end and with a reduced central guide bore 20$^a$ extending from said chamber through said head; also with a plurality of passages 21 surrounding the bore 20$^a$ and communicating at their outer ends with the chamber 22 extending inwardly from the larger chamber 20. 23 denotes a valve-seat block, of hard rubber or other suitable composition, which is fitted within the inner end of the chamber 20 and is provided with a central bore 23$^a$, preferably of the same diameter as the bore 20$^a$ and adapted to discharge into the chamber 22. The valve seat is secured in place by means of a cylindrical plug 24 which is threaded in the bottom of the chamber 20, being provided with opposed slots 24$^a$ for the reception of a screw driver or other suitable tool and having a central bore 24$^b$ which is of greater diameter than the bore 23$^a$.

25 denotes a cone valve head having its enlarged portion in the bore 24$^b$ and adapted to engage the seat 23$^b$ at the outer end of the bore 23$^a$. The valve head is provided with a reduced stem 25$^a$, extending through the bore 23$^a$, through the chamber 22, and into the bore 20$^a$, where the stem is enlarged to engage the latter bore, as shown at 25$^b$.

26 denotes a head having a sleeve 26$^a$ which is threaded upon the projecting end of the part 25$^b$. A spiral spring 27 is interposed between the said head and the head 18, being seated in a groove 18$^a$ in the inner face of the latter head. The parts are so arranged that the spring 27 normally holds the valve head 25 against the seat 23$^b$; and the length of the sleeve 26$^a$ is such that, when the head 26 is pushed in a direction to open the valve, the end of the sleeve will engage the adjacent face of the head 18 before the enlarged part 25$^b$ of the valve stem can close or materially obstruct the bore 23$^a$. Furthermore, by adjusting the head 26, the pressure exerted by the spring 27 between the valve head 25 and its seat 23$^b$ may be varied. The outer end of the valve head 25 is slotted, as shown at 25$^c$, to permit the application of a screw driver or other tool thereto, thereby to prevent the rotation of the valve stem during such adjustment of the head 26. It should be noted further that the capacity of the bore 23$^a$ and of the ports 21 is such that the full capacity of the valve may be realized by a short movement thereof—say about $\frac{1}{16}$th inch. Furthermore, the valve in practice cannot be moved more than about $\frac{1}{8}$ths inch before the sleeve 26$^a$ engages the adjacent face of the head 18. The advantage of this will be pointed out in connection with the diaphragm.

Communicating with and projecting from the opposite side of the body section A' from the gages is a delivery connection 28 to which suitable hose 29 may be applied. B denotes the opposite end cap section of the regulator, the same being provided with a reduced neck portion 30 having the extreme end of the cap portion 30$^a$ provided with a threaded aperture 30$^b$ for the reception of the threaded end of the adjusting plug 31. The inner end of this plug is tapered at 31$^a$ and engages a tapered seat 32$^a$ in a disk 32, said disk having a central projection 32$^a$ adapted to receive one end of a helical spring 33, the opposite end of which spring surrounds a boss 34$^a$ on a backing plate 34. This backing plate engages the central portion of the diaphragm. The diaphragm and the manner of securing the same in place whereby the advantages referred to hereinbefore may be realized will now be described.

The diaphragm comprises a central portion 35, which is slightly bulged away from the valve body, said central portion corresponding to the internal diameter of the body of the end cap B. Surrounding such central portion is a short annular beveled portion 35$^a$ the outer portion of which merges with a flat annular portion 35$^b$ which is in a plane substantially parallel with the plane of the central portion 35. From the outer edge of the portion 35$^b$ there projects an annular flange 35$^c$ which is of a diameter to fit snugly about the adjacent portion of the body section A'.

The cap section B is provided with a tapered or beveled seat 36 for the beveled portion 35$^a$ of the diaphragm and with a flat seat 36$^a$ adapted to bear against the corresponding face of the portion 35$^b$. The seats 36 and 36$^a$ are shown as provided in a heavy annular flange 37 at the enlarged end of the cap section B. This flange in turn is so shaped as to provide a short end flange 37$^a$ which overhangs the flange 35$^c$ for a short distance, leaving the major portion of said flange uncovered and open to the atmosphere.

The end of the body section A' which cooperates with the flange 37 to seat the diaphragm is provided with a relatively narrow annular seat 38 adapted to receive the outer portion of the marginal seating portion 36$^a$ of the diaphragm. Between such portion and the seat 38 there is interposed a washer 39. This washer is of a material other than metal, to reduce the friction between the diaphragm and the seat 38. At present, the washer which I prefer to use is composed of paper saturated with glycerine, and the said washer is preferably fastened to the diaphragm, as by means of shellac. It will be noted that, when the regulator body sections are connected (by the means to be described hereinafter) the end of the flange 37$^a$ is substantially flush with the seat 38.

In order to secure the parts A, A' and B and the diaphragm together and to effect a strong connection between the parts of the regulator body which will prevent the same from being blown apart, the end cap sections are provided with radial lugs 40 and 41. Four such lugs are shown on each of the said sections, and the said lugs are perforated for the reception of strong bolts 42 (preferably of steel) which serve, by tightening the nuts 42$^a$ thereon, to clamp tightly together the sections of the regulator body and to secure the diaphragm in place. These bolts clear the marginal flange 35 of the diaphragm.

Preferably adjacent to the flange 37, the section B is provided with openings 43 providing for the lateral free discharge of gas therethrough in the event that the diaphragm 35 should become ruptured by deterioration thereof or by the development of extremely high pressures within the chamber C.

With the parts constructed and arranged as described, the regulator will be placed in operation by opening the valve 2, after which the plug 31 will be adjusted to cause the central portion of the diaphragm to engage the head 26 to unseat the valve 25. The gas will be discharged into the regulator body and will be delivered through the connection 28, in the usual manner.

Should the pressure of the gas in the chamber C become excessive, it will bulge the diaphragm away from the valve seat 23$^b$, against the action of the spring 33, and close the valve. Should the valve leak, or should the pressure in the chamber C become excessive—say, in excess of five hundred to six hundred pounds per spuare inch—the central portion of the diaphram will be bulged upwardly, as indicated in Fig. 4. This will produce a pull upon the outer portion of the diaphragm and, the washer 39 being made of a material which will not oppose a high frictional resistance thereto, the said outer portion will be drawn inwardly, together with the washer 39, and the gas will escape under the marginal flange 35$^c$, such escape being facilitated by the rupture of the washer. This will provide a lateral escape for the gases without rupturing the diaphragm and without any danger of injuring the operators or those in the vicinity of the regulator.

Should the diaphragm happen to be ruptured, as through deterioration thereof or by the development of a sudden or extremely high pressure, the gases passing through said diaphragm will be discharged laterally through the opening 43, with like immunity from injury to the operators, etc.

By the use of the bolts 42 directly connecting the end sections A and B, there is no danger that the parts A, A' and B of the regulator will be ruptured or blown apart.

While my invention is shown as embodied in a regulator of the type wherein the valve is unseated by the direct operation of the diaphragm, it will be obvious that the construction of the diaphragm and the manner of mounting the same, as well as the manner of connecting the regulator sections, may be employed with other types of regulators. The same is true as to the provision of the relief ports 43 and the manner of connecting the parts 5 and 6 together.

Among the advantages which are realized by my construction are the following:

(a) Absolute safety to the operators or workmen in the vicinity of the regulator, due to the opportunity which is afforded for the gas to be discharged laterally from the regulator without rupture of any of the parts of the casing thereof.

(b) Convenience and ease of assembling and strength of assembly, due to the provision of the bolts 34 and the construction of the caps or covers in such manner as to cooperate with and receive such bolts.

(c) Durability of the parts. In this connection it should be noted that, with regulators as ordinarily constructed, the back cap B is threaded onto the body A'. In operation, the workmen frequently screw home this back with such force that the thread is partly stripped, resulting in the blowing off of the cap under pressure, with resultant injury.

(d) The diaphragm will not be ruptured by the development of pressures up to five hundred to six hundred pounds per square inch, but will be drawn at its margin, permitting the escape of the gas around such edge.

(e) The valve parts are readily adjustable and can be removed and replaced in a very short time and in a very convenient manner.

(f) The bolts which connect the parts are the only parts which can be tightened by unskilled operators; and this minimizes the chances of injury to regulators of this class.

(g) The connections between the tank and the regulator body cannot be injured, either by the high pressure of the gas or by the twisting action imparted to such connections by the operators in turning on and off the gas.

(h) The valve is cheap of construction, and the parts thereof and the valve seat, if worn, can be removed and replaced within a short time and at a trifling expense.

This application is a continuation in part of my application No. 660,476, filed September 1, 1923.

Having thus described my invention, what I claim is:

1. In a regulator, the combination of a casing comprising a body section provided at one end with an annular seat, a diaphragm extending across such end of said section and having a marginal portion adapted to engage said seat, there being a washer of anti-friction material interposed between such portion of the diaphragm and such seat, the said diaphragm having a marginal flange adapted to extend over the outer surface of such end of the body section, a valve co-operating with said diaphragm to admit gas to said body, an end section having a marginal portion adapted to engage the marginal portion of the diaphragm on the opposite side of said seat and having a flange adapted to overhang and engage a portion only of the marginal flange of said diaphragm, leaving the remainder of said flange exposed to the atmosphere, and means for securing the said body and the said end section together, the said washer permitting the marginal portion of the diaphragm to move relatively to the casing sections when said diaphragm is subjected to excessive pressure.

2. In a regulator, the combination of a casing comprising a body section provided at one end with an annular seat, a diaphragm extending across such end of said section and having a marginal portion adapted to engage said seat, there being a washer of anti-friction material interposed between such portion of the diaphragm and such seat, the said diaphragm having a marginal flange adapted to extend over the outer surface of such end of the body section, a valve co-operating with said diaphragm to admit gas to said body, an end section having a marginal portion adapted to engage the marginal portion of the diaphragm on the opposite side of said seat and having a flange adapted to overhang and engage a portion only of the marginal flange of said diaphragm, leaving the remainder of said flange exposed to the atmosphere, and means for securing the said body and the said end section together, the said end section having one or more openings for discharging laterally therefrom any gas which may enter the same through rupture of the said diaphragm, the said washer permitting the marginal portion of the diaphragm to move relatively to the casing sections when said diaphragm is subjected to excessive pressure.

3. In a regulator, the combination of a casing comprising a body section provided at one end with an annular seat, a diaphragm extending across such end of said section and having a marginal portion adapted to cooperate with said seat, a valve cooperating with said diaphragm to admit gas to said body, an end section having a seat adapted to cooperate with the marginal portion of the diaphragm on the opposite side of the former seat, the said diaphragm having a marginal flange adapted to overhang the outer surface of one of said sections and the other section having a flange adapted to overhang a portion only of such diaphragm flange, leaving the end of the last-mentioned flange unconfined, a washer of anti-friction material between one of such seats and the cooperating portion of the diaphragm, and means for securing the said body and the said end section together, the said washer permitting the marginal portion of the diaphragm to move relatively to the casing sections when said diaphragm is subjected to excessive pressure.

4. In a regulator, the combination of a casing comprising a body section having at one end an annular seat, a diaphragm extending across such end of said section and having a marginal portion adapted to engage said seat and a peripheral flange projecting from such marginal portion, there being a washer of anti-friction material interposed between such marginal portion of the diaphragm and said seat, an end section secured to said body section and having an annular seat of greater width than the first mentioned seat and engaging the marginal portion of the diaphragm which is opposite such first seat, the said end section having a marginal flange covering part only of the peripheral flange on the diaphragm and having, within such annular seat, a beveled annular seat, the outer portion of the diaphragm conforming in shape to the marginal seat and the last-mentioned seat on the end section, a valve adapted to be opened by movements of the diaphragm to admit gas to said body, and means for connecting the said body section and end section, the said washer permitting the marginal portion of the diaphragm to move relatively to the casing sections when said diaphragm is subjected to excessive pressure.

5. In a regulator, the combination of a casing comprising a body section having an annular seat at one end thereof, a valve for admitting gas to said body section, a diaphragm extending across the said seat and arranged to be operated to open the said valve, an end section opposed to said body section and having a cooperating seat, a washer of anti-friction material between said diaphragm and one of said seats, and means for connecting the said sections and for clamping the diaphragm therebetween, the said washer permitting the marginal portion of the diaphragm to move relatively to the casing sections when said diaphragm is subjected to excessive pressure.

6. In a regulator, the combination of a casing comprising a body section, a valve for admitting gas thereto, a diaphragm extending across an end of said body and adapted to unseat said valve, an end section secured to said body and means for clamping the said body section and the said end section together with the marginal portion of the diaphragm therebetween, the said clamping means permitting the marginal portion of the diaphragm to slip through the bulging of the body of the diaphragm, thereby to permit the escape of gas therebeyond when a predetermined pressure of gas in said body has been attained, insufficient to rupture the said diaphragm.

7. In a regulator, the combination of a body having a diaphragm extending thereacross to provide a chamber for the reception of gas, a valve for controlling the supply of gas to said chamber, said valve comprising a valve seat body having a bore therethrough, a valve seat block in said body provided with an annular seat having a bore therethrough registering with the bore in said body and a valve head adapted to engage said seat and provided with a stem extending therefrom toward said diaphragm and through and spaced from the bore in said block, the said stem having an enlarged guide portion mounted in the bore of said valve seat body, there being passages through said valve seat body surrounding such guide, said passages receiving the gas from the said bore, a head having a sleeve mounted on the enlarged guide portion of the valve stem, said head being adapted to be engaged by the central portion of the diaphragm, a spring interposed between the last mentioned head and the valve mounting, means for moving the central portion of the diaphragm toward said valve seat thereby to operate the valve stem, the said sleeve being adapted to engage the valve mounting when the valve has been moved a predetermined distance by the diaphragm, whereby distortion of the diaphragm by its operating means is prevented.

8. A valve for regulators comprising a mounting having a body adapted to be threaded into a gas-receiving connection and a head adapted to engage the portion of the regulator body surrounding said connection, the body having a bore extending thereinto from the end opposite said head, a valve seat block in the bottom of said bore and having a central bore therethrough, a ring adjustably mounted in the opposite end of said bore and locking the said seat in place, a valve comprising a valve head adapted to engage said seat and a stem mounted within and spaced from the bore of said seat and provided with an enlarged portion constituting a guide mounted in a central bore extending through the first head, the first head having bores therethrough surrounding or grouped about the central bore thereof and adapted to receive gas discharged through the bore of said valve seat, a head carried by said valve stem, and a spring interposed between and engaging the first and third heads.

In testimony whereof, I hereunto affix my signature.

JOHN HARRIS.